United States Patent
Pavageau (10) Patent No.: US 10,027,044 B2
(45) Date of Patent: Jul. 17, 2018

(54) SECURED INTEGRATED CIRCUIT CONNECTOR

(71) Applicant: INGENICO GROUP, Paris (FR)

(72) Inventor: Stephane Pavageau, La Roche de Glun (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/204,270

(22) Filed: Jul. 7, 2016

(65) Prior Publication Data

US 2017/0012375 A1   Jan. 12, 2017

(30) Foreign Application Priority Data

Jul. 7, 2015   (FR) .................................. 15 56439
Sep. 11, 2015  (FR) .................................. 15 58450

(51) Int. Cl.
| | | |
|---|---|---|
| *H01R 12/70* | (2011.01) | |
| *G06K 7/00* | (2006.01) | |
| *H01R 13/03* | (2006.01) | |
| *H01R 13/24* | (2006.01) | |
| *H01R 43/16* | (2006.01) | |
| *H01R 43/24* | (2006.01) | |

(52) U.S. Cl.
CPC ....... *H01R 12/7076* (2013.01); *G06K 7/0021* (2013.01); *H01R 13/03* (2013.01); *H01R 13/2442* (2013.01); *H01R 43/16* (2013.01); *H01R 43/24* (2013.01)

(58) Field of Classification Search
CPC .............................. H01R 13/03; H01R 12/721
USPC .................................................. 439/630, 886
See application file for complete search history.

(56) References Cited

U.S. PATENT DOCUMENTS

| | | | | |
|---|---|---|---|---|
| 4,245,876 A | * | 1/1981 | Ritchie | H01R 12/7082 439/590 |
| 4,921,430 A | | 5/1990 | Matsuoka | |
| 5,169,321 A | * | 12/1992 | Matsuoka | H01R 13/03 439/71 |
| 5,277,592 A | * | 1/1994 | Morlion | H01R 13/03 439/108 |
| 5,295,840 A | * | 3/1994 | Matsuoka | H05K 7/10 29/876 |
| 5,613,861 A | * | 3/1997 | Smith | G01R 1/06711 200/246 |
| 6,478,586 B1 | * | 11/2002 | Ma | H01R 13/26 439/79 |

(Continued)

FOREIGN PATENT DOCUMENTS

| | | |
|---|---|---|
| EP | 2166623 A1 | 3/2010 |
| EP | 2793314 A1 | 10/2014 |

OTHER PUBLICATIONS

Preliminary Seach Report from FR 1558450, dated Apr. 29, 2016, TESKE, Ekkehard.

(Continued)

*Primary Examiner* — Tulsidas C Patel
*Assistant Examiner* — Marcus Harcum
(74) *Attorney, Agent, or Firm* — BCF LLP (57) ABSTRACT

The technology relates to a secured integrated circuit connector. More particularly, the technology relates to a connection blade for an integrated circuit connector, comprising a contact zone for the reading of an integrated circuit. According to the technology, said connection blade comprises at least one electrically insulated zone.

11 Claims, 6 Drawing Sheets

(56) References Cited

U.S. PATENT DOCUMENTS

| | | | |
|---|---|---|---|
| 6,790,055 B1* | 9/2004 | Shiu | H01R 12/57 439/260 |
| 7,748,991 B2* | 7/2010 | Nikaido | H05K 3/326 439/71 |
| 8,251,713 B2* | 8/2012 | Lin | H01R 12/718 439/71 |
| 8,784,118 B2* | 7/2014 | Ihara | H01R 13/2442 439/66 |
| 8,827,733 B2* | 9/2014 | Yoshida | H01R 12/57 439/267 |
| 9,325,097 B2* | 4/2016 | Do | |
| 2002/0184759 A1 | 12/2002 | Wimmer | |
| 2003/0109182 A1 | 6/2003 | Miyazawa et al. | |
| 2013/0337694 A1* | 12/2013 | Chen | H01R 12/721 439/637 |

OTHER PUBLICATIONS

English abstract of EP2793314 retrieved from Espacenet on Jul. 7, 2016.

\* cited by examiner

SECURED INTEGRATED CIRCUIT CONNECTOR

CROSS-REFERENCE TO RELATED APPLICATION

This United States Non-Provisional Patent Application claims priority from French Patent Application Serial No. 15 56439, filed on Jul. 7, 2015 and from French Patent Application Serial No. 15 58450, filed on Sep. 11, 2015, the entire content of which are incorporated herein by reference.

FIELD OF THE TECHNOLOGY

The technology is situated in the field of integrated circuit connectors, of the type disposed on a memory card (smartcard). An object of the technology more particularly is a connection blade for an integrated circuit connector. The technology also relates to an integrated circuit connector to be inserted into a memory card read terminal. Such a terminal can be a payment terminal or an identification terminal. More generally, the technology relates to any type of terminal that can include an integrated circuit reader.

BACKGROUND

Memory card read terminals comprise, in addition to a memory card reader, a certain number of components such as a keypad, a screen, one or more processors, memory, a source of electrical power. For several years now, there has been a great increase in the functions of memory card read terminals. This is especially true for payment terminals. In addition to the payment function, the terminals embed networked communications functions, functions for detecting contactless memory cards, token management functions (for example for loyalty tokens), etc.

In addition to the great increase in such ancillary functions, memory card reader terminals must be resistant to various attacks or attempts at fraud to which they are frequently subjected. International standards have been promulgated to achieve homogeneity in the resistance of terminals to attacks. For example, in the field of payment the PCI PED (Payment Card Industry—Pin Entry Device) standard lays down requirements in terms of intrusion and detection of attempted attacks on terminals. These are not the only standards prevailing today.

However, because of these standards, terminals which were hitherto relatively unprotected are gradually being replaced by increasingly secured terminals. Among the points related to the securing of terminals, industrial firms in the sector are more particularly concerned with protecting the integrated circuit reader. The integrated circuit reader indeed is the weak link of the integrated circuit read terminal. This is because the integrated circuit reader has a slot for the insertion of the integrated circuit and this slot makes the interior of the terminal accessible from the exterior. More particularly, attackers try to obtain access to the integrated circuit. The integrated circuit connector is the part of the integrated circuit reader that comes into contact with the chip or the microprocessor embedded in the integrated circuit. When an attacker succeeds in gaining access to this integrated circuit connector without anyone being aware of it, he can intercept and read data exchanged between the chip or the microprocessor of the card and the processor of the integrated circuit read terminal. The intercepted data includes especially the secret code entered by the customer when the secret code is requested. This secret code can be carried without encryption on certain smartcards.

This explains why much effort has been spent on securing the integrated circuit reader. Thus, for example, integrated circuit readers have been provided with a lattice-based protection. This protection prevents insertion being done through the drilling of the terminal. When an object tries to penetrate the protective enclosure, a short circuit is produced, putting the terminal out of operation.

Figure 1:
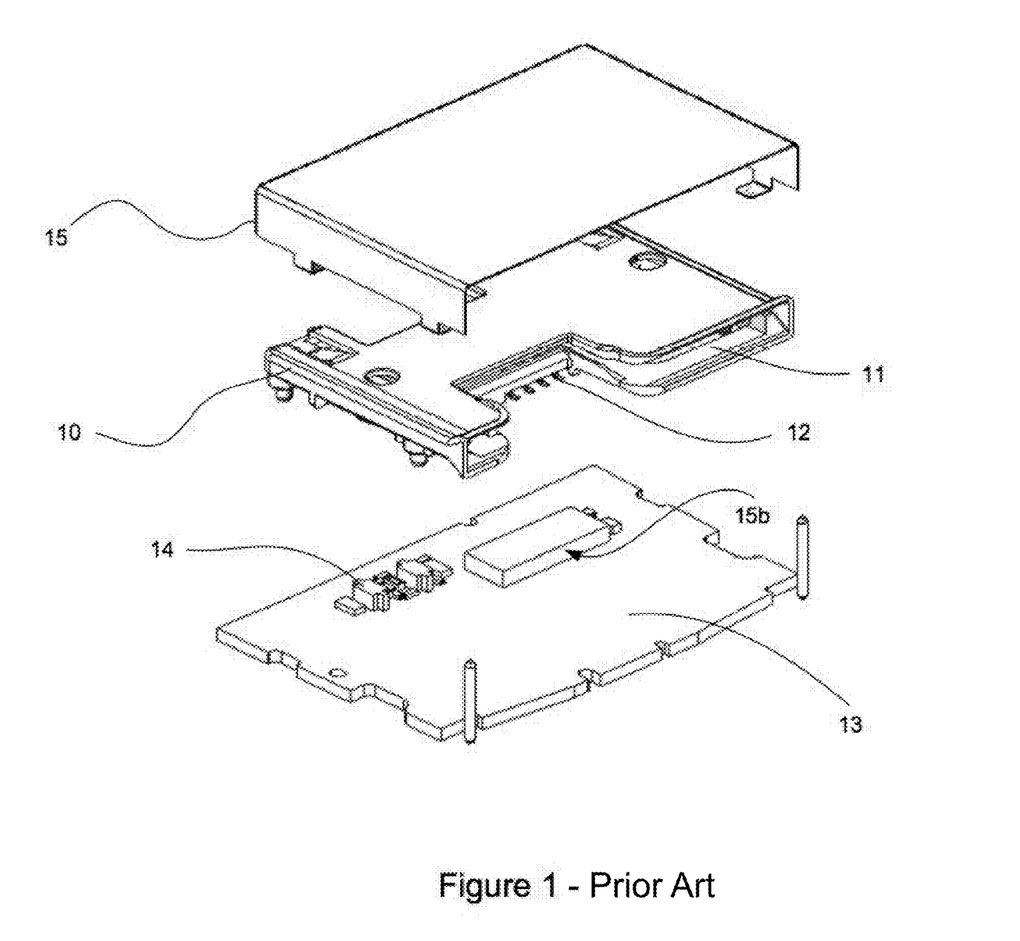
FIG. 1, already presented, describes the classic architecture of an integrated circuit connector.

Referring to FIG. 1, a description is provided of a classic assembly of an integrated circuit reader. This integrated circuit reader comprises an integrated circuit reader 10, comprising a slot for inserting an integrated circuit 11. The integrated circuit connector is directly integrated into the integrated circuit reader. It has pins 12 for connection to the printed circuit board (PCB) 13 (partial view). The PCB 13 also comprises electronic components 14. The memory card reader 10 is protected by being covered with a complete protection 15 as well as a front protection 15b.

In order to resolve the problems posed by memory card readers, it has been proposed to separate the integrated circuit connector and the body of the integrated circuit connector into two distinct functional units.

Such a separation makes it possible to propose novel measures for securing both the integrated circuit connector and the body of the integrated circuit reader itself.

Figure 2:
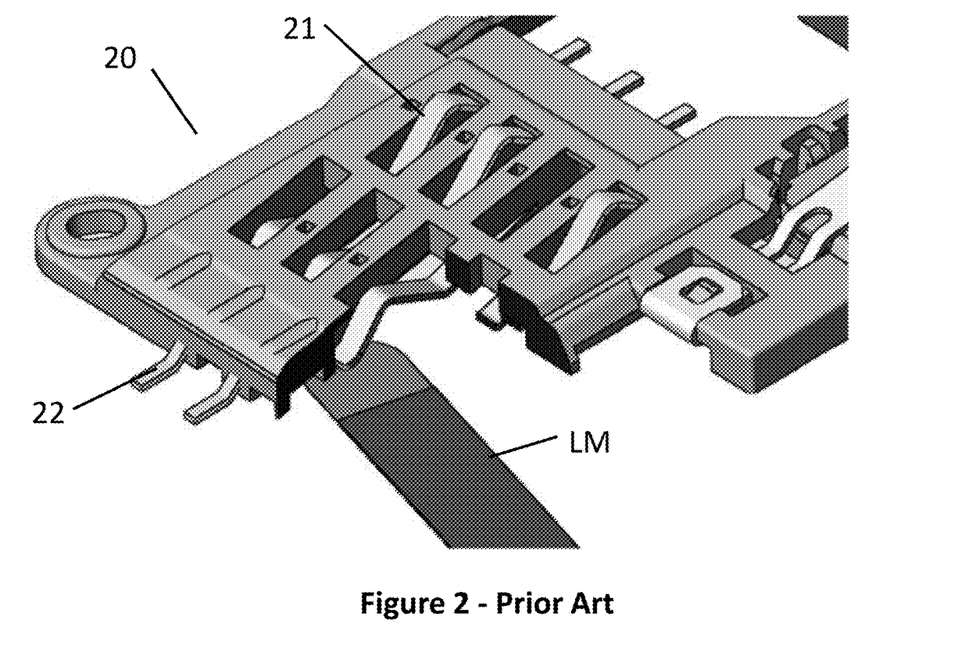
FIG. 2, already presented, illustrates a common form of attempted fraud aimed at inserting a metal blade beneath the integrated circuit connector.

However, the goal of attaining maximum securing for the terminals makes it necessary to have an integrated circuit connector (chip connector) that can meet the new requirements of the industry. Indeed, a novel type of fraud has to be coped with. This fraud is illustrated with reference to FIG. 2. In this fraud, a partially insulated metal blade LM is inserted beneath the integrated circuit connector at the level of the connection blades. (A connection blade is a metal blade comprising a connection portion 22 which comes into contact with the mother board of the integrated circuit reader, a contact zone 21 which comes into contact with the integrated circuit and a linking portion 23 connecting the contact zone 21 and the connection portion 22.) The insertion of this metal blade LM makes it possible to sense those connection blades that are activated and to intercept the data transmitted between the terminal and the smartcard.

There is therefore a need to provide an architecture of integrated circuit connector that is intrinsically secured and does not require any complementary protection.

SUMMARY OF THE TECHNOLOGY

The proposed technique does not have these drawbacks of the prior art. The proposed technique relates more particularly to a connection blade for an integrated circuit connector, comprising a contact zone for the reading of an integrated circuit, characterized in that said connection blade comprises at least one electrically insulated zone.

Thus, it is not possible to try and read the electrical signal travelling through this contact.

According to one particular characteristic, said connection blade comprises an upper surface and a lower surface, said upper surface being intended for being oriented towards an integrated circuit, said lower surface being intended for being oriented towards a printed circuit board to which said connection blade is connected, said at least one electrically insulated zone being situated at least partly at said lower surface.

Thus, it is not possible to make a signal-reading device pass beneath the blade in order to read the signal travelling between this blade and the integrated circuit.

According to one particular characteristic, said contact zone has a curved shape capable of coming into contact with an integrated circuit and said connection blade comprises a first electrically insulated zone situated on said lower surface, at least partly at said contact zone.

According to one particular characteristic said connection blade further comprises a connection portion to be connected to a printed circuit, and said connection blade comprises a second electrically insulated zone situated at least partly at said connection portion.

Thus, the possibilities of reading the signal travelling through the contact are further limited.

According to one particular characteristic, said connection blade further comprises a linking portion connecting said contact zone and said connection portion, and said connection blade comprises a third electrically insulated zone situated at least partly at said linking portion.

According to one particular characteristic, said electrically insulated zone comprises an electrical insulator belonging to the group comprising: a resin, an insulating varnish, an insulating adhesive.

According to one particular embodiment, said electrically insulated zone comprises an electrical insulator constituted by a polyurethane-type resin. The polyurethane-type resin has the advantage of having high chemical and thermal resistance. Another type of resin could be used, for example an over-molded plastic material.

In another aspect, the technology also relates to an integrated circuit connector comprising at least one connection blade as described above.

According to one particular characteristic, said connector comprises a parallelepiped-shaped base within which said at least one connection blade is positioned.

In another aspect, the technique also relates to a payment terminal comprising an integrated circuit connector as described above. In another aspect, the technology also relates to a method for manufacturing a connection blade of an integrated circuit connector, said method comprising:

a step for shaping a metal blade, delivering a shaped metal blade, a step for cutting out said shaped metal blade, said method further comprising a step for applying an electrically insulated coating on at least one zone of said connection blade.

According to one particular characteristic, the step for applying a lining comprises a step for gluing an insulating adhesive to said at least one lower surface of said connection blade, at a contact zone for the reading of an integrated circuit. It is also possible to apply the resin before formatting or before assembly.

According to one particular characteristic, the application of a lining comprises a step for depositing a drop of resin on said at least one lower surface of said connection blade, at a contact zone for the reading of an integrated circuit. The use of a drop at least partly dictates an implementation by gravity (i.e. gravity makes the drop fall on the support). Another method could be the implementing of an over-molding operation (at high or low pressure).

FIGURES

Other features and advantages of the technology shall appear more clearly from the following description of a preferred embodiment, given by way of a simple illustrative and non-exhaustive example, and from the appended drawings of which.

DESCRIPTION

The general principle of the present technology consists of the insulation of one or more zones of the contact blades of an integrated circuit connector so that they are not snooped on by any device provided with a metal wire to reach the connection blades at the zones accessible from outside the connector.

FIGS. 3 to 6 illustrate this general principle. In these figures, the lightly shaded zones represent the metal part of the connection blades 40 of the integrated circuit connector while the heavily shaded zones represent the parts insulated by an insulator. This insulator can be optionally resin (a locally deposited drop), an insulating varnish or an adhesive. This insulator is an efficient defense, especially against the attacks described above. Indeed, because of the insulator, even when the attacker succeeds in inserting a metal wire beneath the connection blade, he cannot come into contact with it without damaging the blade itself (i.e. removing the insulator). Now, such an action will necessarily cause great deterioration in the terminal itself. Such deterioration will be perceived by the terminal which will then be able to trigger appropriate protective measures.

Figure 3:
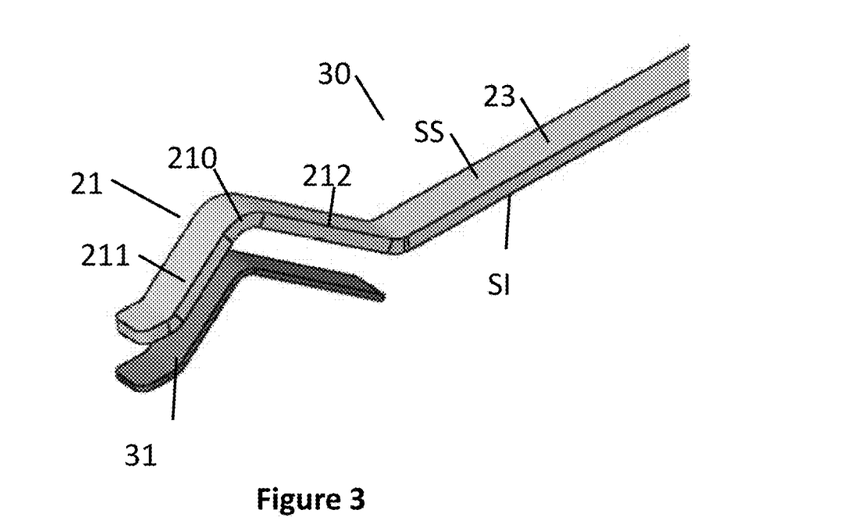
FIG. 3 is an exploded view of a contact zone of a connection plate according to the proposed technique.
Figure 9:
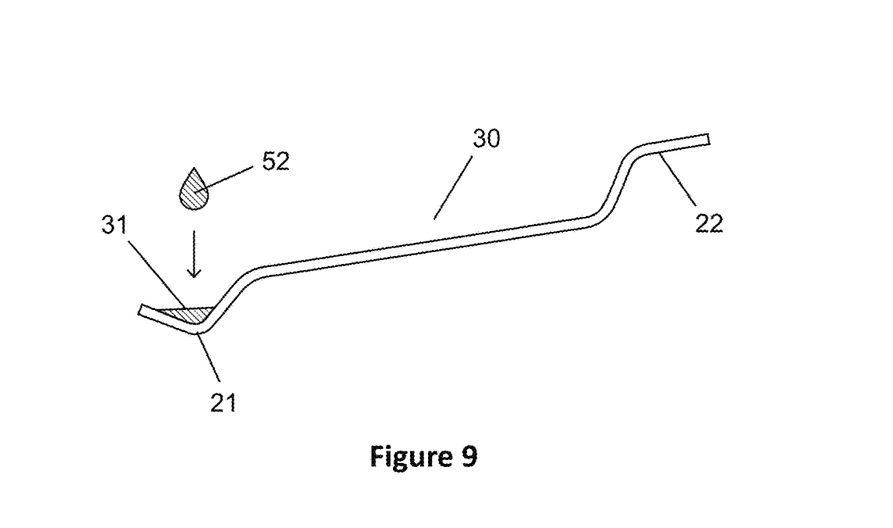
FIG. 9 illustrates an embodiment in which a drop of resin is applied to the connection blade of FIG. 4.

FIG. 3 is an exploded view of a contact zone 21 of a connection blade 30 of an integrated circuit reader. The connection zone 21 has a curved shape comprising two sections 211, 212 that are tilted relative to the linking portion 23 and a curved section 210 between the two tilted sections 211, 212. The connection blade 30 comprises an upper surface SS and a lower surface SI. The upper surface SS is to be oriented towards an integrated circuit. The lower surface SI is designed to be oriented towards a printed circuit board to which the connection blade 30 is connected. The upper surface SS of the connection blade 30 in the curved section 210 is to come into contact with a contact zone of an integrated circuit in order to transmit signals. According to the proposed technique, the connection blade 30 comprises a first electrically insulated zone implemented by an electrical insulator 31 placed on its lower surface SI at the level of the contact zone 21. Indeed, the space beneath the contact zone 21, of a curved shape, is particularly vulnerable because this space beneath this contact zone 21 makes it possible to let through a probe (a metal blade or an electrical cable) coming into contact with the lower surface of the connection blade 30. Because of the electrical insulator 31, the probe can no longer come into contact with the metal part of the connection blade 30. The sensitive signals transmitted by this connection blade are thus protected. In the embodiment illustrated in FIG. 9, the insulator 31 is implemented by depositing a drop of resin 52 which has the additional advantage of filling the interstice between the blade and the plastic which, in addition to providing insulation, prevents any object from passing beneath the contact.

Figure 4:
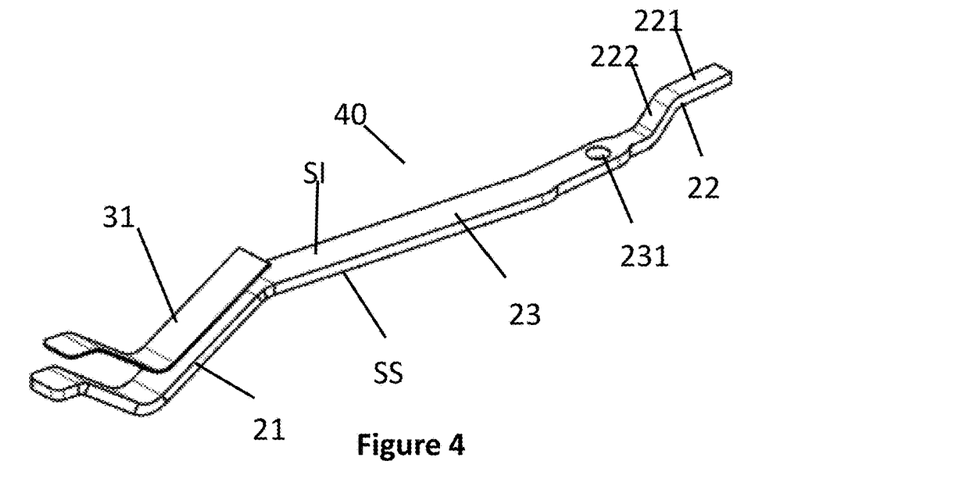
FIG. 4 illustrates a connection blade of the present technique.

FIG. 4 illustrates the connection blade 40 comprising a contact zone 21, a connection portion 22 and a linking portion 23 connecting the contact zone 21 and the connection portion 22. The connection portion 22 comprises a section that is tilted relative to the linking portion 23 and a connection section 221. The connection section 221 is appreciably parallel to the linking portion 23 and has a height different from the linking portion 23. When this blade is mounted in an integrated circuit connector of a terminal, the connection section 221 is connected (for example by soldering) to a printed circuit board of the terminal. The linking portion 23 has a fastening hole 231 at its extremity near the connection portion. This fastening hole 231 is used to fix the connection blade to a base of an integrated circuit connector.

The connection blade 40 also has an upper surface SS and a lower surface SI. The upper surface SS is to be oriented towards a chip of an integrated circuit. The lower surface SI is to be oriented towards a printed circuit board to which the connection plate 40 is connected (for example a mother board of a terminal). The connection blade 40, in this illustration, has a first electrically insulated zone formed by an electrical insulator 31 placed on its lower surface SI at the level of the contact zone.

Figure 10:
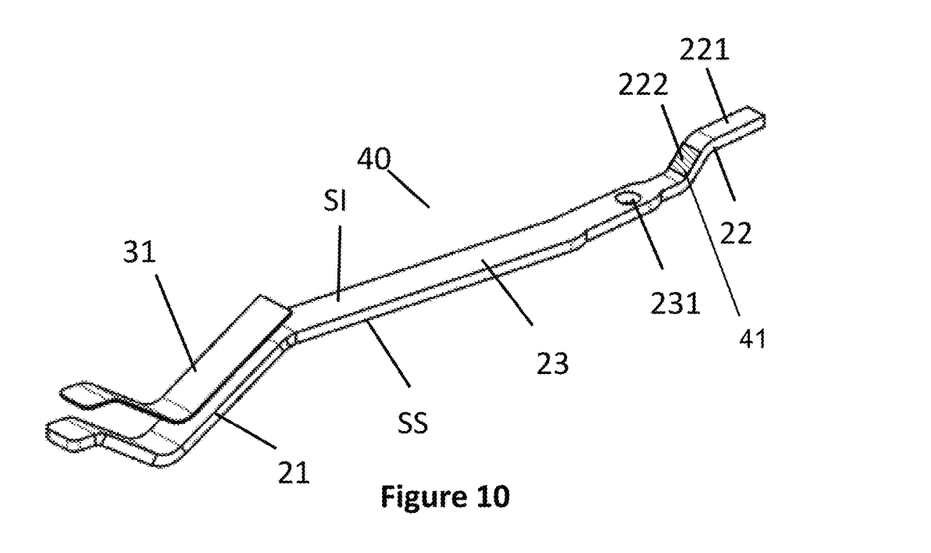
FIG. 10 illustrates an alternative embodiment of the connection blade of FIG. 4.

In the spring leaf 40, illustrated in FIG. 4, the connection portion 22 has no electrically insulated zone. However, it is quite possible to consider implementing a second electrically insulated zone at the level of the connection portion 22. For example, in an alternative embodiment illustrated in FIG. 10, electrical insulators 41 can be placed on the lower surface SI and/or the upper surface SS at the level of the tilted section 222 of the connection portion 22. It is also possible to envisage insulating the upper surface SS at the connection section 221 of the connection portion by means of an electrical insulator. However, it is not necessary to protect the lower surface SI in the connection section 221 because it is to be connected to a printed circuit of a terminal. Besides, the upper surface SS and/or the lower surface SI in the connection portion 22 can also be electrically insulated by an insulator.

Figure 5:
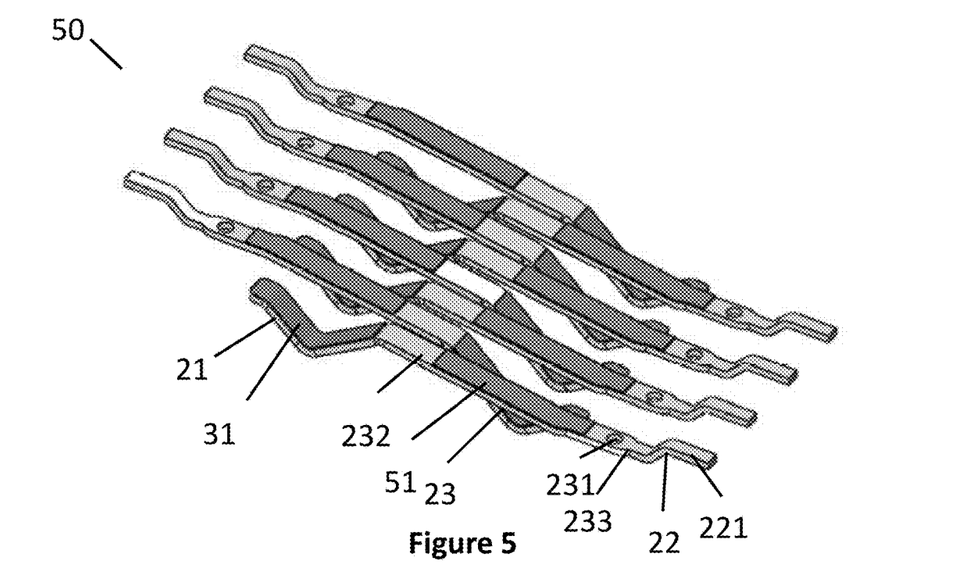
FIG. 5 illustrates eight connection blades assembled for one integrated circuit connector.

FIG. 5 illustrates eight connection blades 40 assembled to form the internal metal structure 50 of an integrated circuit connector. In this embodiment, the connection blade 40 comprises a third electrically insulated zone. More specifically, the lower surface in the linking section 23 of each connection blade 40 is electrically insulated by an electrical insulator 51. Indeed, when the assembled connection blades are mounted in an integrated circuit connector, the linking portion 23 is situated in a plane having a height greater than that of the connection section 221 soldered to a printed circuit. There is thus a (possibly empty) space between the linking portion 23 and a printed circuit to which the connector is soldered. A fraudulent individual could thus try and insert a probe into this space above the linking portion 23. This probe would come into contact with the lower surface of the metal part of the connection blade 40. This attempt would be doomed to failure. Indeed, because of this electrical insulator 51, the probe can no longer come into contact with the metal part of the connection plate 40 in the linking portion 23. The sensitive signals transmitted by this connection blade 40 are thus protected.

In the embodiment illustrated in FIG. 5, for each connection blade 40, two zones 232, 233 at the two extremities of the linking portion 23 are not electrically insulated. The zone 232 is near the contact zone 21. The zone 231 is near the connection portion 21. Indeed, when the assembled blades are mounted in an integrated circuit connector, the zones 232 are supported by a part of a base of an integrated circuit connector: these zones are therefore not accessible. The zones 233 comprising the fastening holes 231 co-operate with the base of the connector on the one hand and are soldered to the mother board on the other hand. Thus, the zones 232 and 233 do not need to be protected.

According to one specific embodiment of the proposed technique, the electrical insulator can be placed solely on the connection blade or blades which transmit sensitive signals. Indeed, for example, the connection blade for the power supply transmits no sensitive signal. It does not require protection by insulator. The cost of manufacturing connection blades can thus be reduced.

Figure 6:
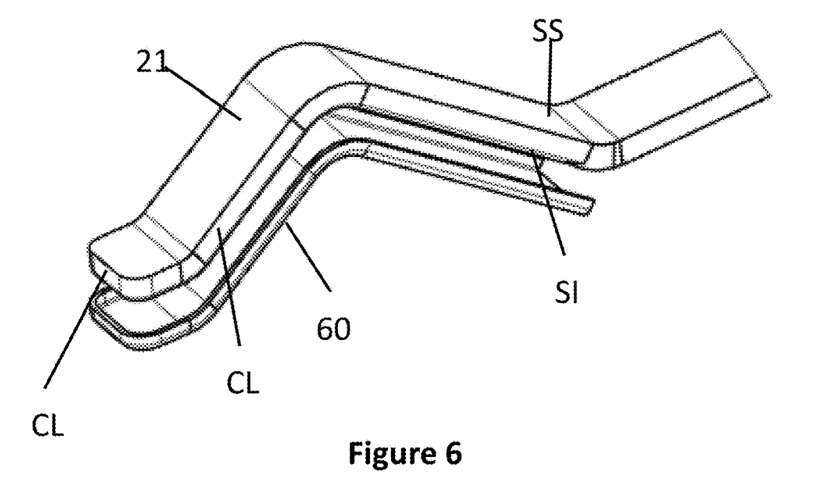
FIGS. 6 and 7 illustrate a contact zone of a connection blade according to one specific embodiment of the present technique.

FIG. 6 is an exploded view of a contact zone of a connection blade according to one specific embodiment of the proposed technique. This contact zone 21 comprises especially an insulating sheath 60 placed on the lower surface SI at the contact zone. This contact sheath 60 covers not only the lower surface SI in the contact zone 21 but also a part of the lateral sides CL of the contact zone 21. This covering of the lateral zones offers greater protection. It prevents lateral contact.

Figure 7:
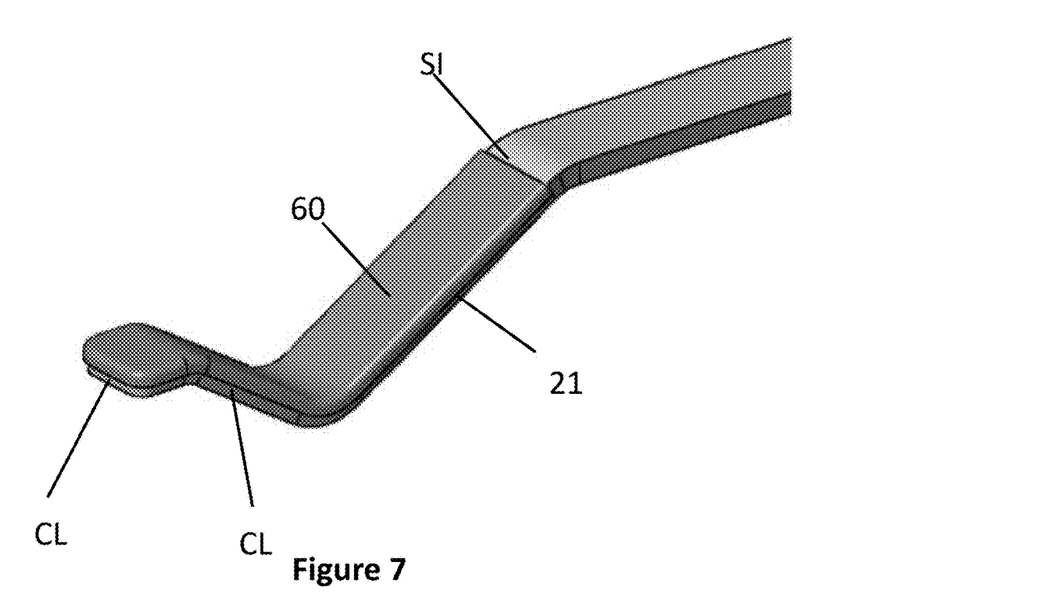

In FIG. 7, the insulating sheath 60 is mounted on the lower surface SI of the contact zone 21 of the connection blade. The lateral sides CL of the contact zone 21 are partially covered by the insulating sheath 60. This insulating sheath 60 improves the lasting quality and reliability of the insulating zone. It is also a means to make sure that even the ridges are protected and that therefore the total surface is insulated. Indeed, it is more difficult to remove this insulating sheath. According to another embodiment, the lateral sides CL of the contact zone are entirely covered with the insulating sheath 60. Thus, it is no longer possible to set up electrical connection at the lateral side CL of the contact zone 21. Naturally, a similar insulating sheath could be placed in another zone of the connection plate in order to protect the sides and improve the lasting quality and reliability of the insulating zone.

The proposed technique also relates to a method for manufacturing a connection blade of an integrated circuit connector. Such a method comprises:

a step for shaping a metal blade delivering a shaped metal blade. This step for shaping may consist in folding the metal blade. The shape of the contact zone and the shape of the connection portion can thus be formed with the metal blade. This step for formatting is appreciably identical to the prior art steps in the field;

a step for cutting out said shaped metal blade;

at the end of these two steps, the shaped metal blade becomes a connection blade which, according to the prior art techniques, can be integrated into a prior art connector.

According to the proposed technique, said method further comprises, before or after said steps for shaping and cutting out, a step for applying a lining, consisting of an electrical insulator, to said metal blade. When this step is performed before the step for shaping, it is not necessary to target the specific zones on the metal blade for the lining. The manufacturing method is therefore simplified. In addition, the resistance of the electrical insulator can also be reinforced in several aspects:

the step for shaping can be implemented by means of a press; such an implementation makes it possible to harden the insulator locally, making it even more difficult to remove;

the cutting-out step is done at the same time, and the surface to be protected (lower surface SI) will be completely covered and the contact surface (upper surface SS) will thus be completely devoid of covering, whether the material used is a resin, a varnish or an adhesive.

besides, during the steps for shaping and cutting out, the contact fields of the contact pins can be shaped so that the insulator falls locally on the edge of the contact, thus making access to the contact zone extremely complicated.

According to another embodiment of the proposed technique, this electrical insulator can be placed after the manufacture of the connection blade, i.e. after the steps for shaping and cutting out. The utility of placing this insulator at the end of the process is that it provides for flexibility of manufacture. In this case, the means to be preferred are an adhesive bonded to a lower surface of the connection blade, at the level of the contact zone or again a small drop of resin deposited beneath the contact zone (on the lower surface of the connection blade at the contact zone). It could be more difficult to apply the varnish in the case of an application at the end of the process because no unevenness is permitted on the 'functional contact' surface. The cost of such an implementation could therefore be higher.

A drop of UV type resin, relatively easy to implement, for example of the Acrylate-Urethane type, solidified by polymerization, is also a possible approach in another embodiment. Such an approach is presented with reference to FIG. 8.

Figure 8:
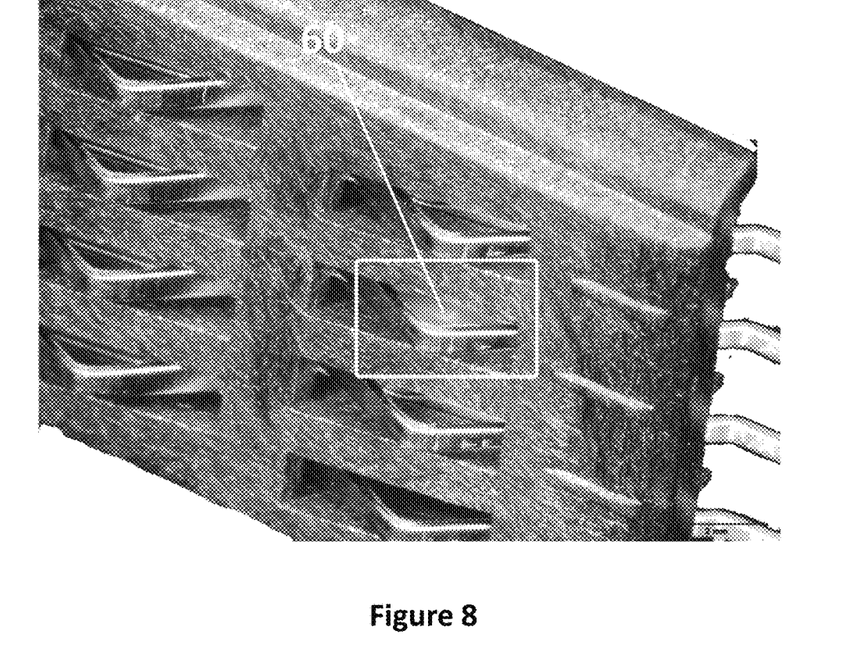
FIG. 8 explains an embodiment of the technique for insulating electrical contacts.

As illustrated, a drop of polymerizable resin is applied after the manufacture of the integrated circuit connector. This has the advantage of not requiring a manufacturing process very different from existing processes (and therefore not giving rise to excessively high costs). Thus, the contact sheath 60 is constituted by a resin that is polymerized by UV. In this embodiment, only one contact is protected. It is of course possible to consider protecting all the contacts of a same group (for example to deposit one drop of resin on all the front contacts of a connector). In the latter case, there is a barrier preventing the insertion of any element beneath the connector. There is therefore greater securing. In this latter case, it is advantageous to carry out the process upstream on all the contacts at the same time, before the manufacture of the connector, because then there is only one operation for depositing matter (i.e. only one operation for depositing resin).

In one embodiment, the resin used will be Vitralit® 9180 which especially has the advantage of being resistant to high temperatures (and therefore to the operation of soldering the connector to a printed circuit board, which can be done by reflow soldering) and therefore the viscosity (at the time when the drop is placed) is also adapted to the manufacturing process. Besides, such a resin has the advantage of having high chemical resistance in order to prevent other types of attacks (i.e. chemical attacks for example).

The invention claimed is:

1. A connection blade for an integrated circuit connector, the connection blade having a constant thickness, the connection blade comprising:
    a connection portion for connection to a printed circuit board;
    a contact zone for reading an integrated circuit;
    a linking portion connecting said connection portion and said contact zone;
    said contact zone comprising:
        first and second sections tilted relative to the linking portion, said first and second sections defining an obtuse angle therebetween;
        a curved section connected between said first and second sections, said curved section being capable of coming into contact with the integrated circuit; and
        an extremity portion extending from said second section and being aligned with said linking portion; and
    said connection blade further comprising at least one electrically insulated zone, and
    said at least one electrically insulated zone comprising an electrical insulator positioned at a lower surface of said connection blade under said first, second and curved section of said contact zone.

2. The connection blade of claim 1, wherein said connection blade comprises an upper surface and a lower surface, said upper surface being intended for being oriented towards the integrated circuit, said lower surface being intended for being oriented towards the printed circuit board to which said connection strip is to be connected, said at least one electrically insulated zone being situated at least partly at said lower surface.

3. The connection blade of claim 2, wherein said at least one electrically insulated zone comprises a first electrically insulated zone situated on said lower surface, at least partly at said contact zone.

4. The connection blade of claim 3, wherein said at least one electrically insulated zone further comprises a second electrically insulated zone situated at least partly at said connection portion.

5. The connection blade of claim 4, wherein said at least one electrically insulated zone further comprises a third electrically insulated zone situated at least partly at said linking portion.

6. The connection blade of claim 1, wherein said electrical insulator belongs to the group comprising: a resin, an insulating varnish, an insulating adhesive.

7. An integrated circuit connector, the integrated circuit connector comprising at least one connection blade according to claim 1.

8. The integrated circuit connector of claim 7, further comprising a parallelepiped-shaped base within which said at least one connection blade is positioned.

9. A method for manufacturing a connection blade of an integrated circuit connector, said method comprising:
    shaping a metal blade;
    delivering a shaped metal blade having a constant thickness;
    cutting out said shaped metal blade to obtain:
        a connection portion for connection to a printed circuit board;
        a contact zone for reading an integrated circuit;
        a linking portion connecting said connection portion and said contact zone;
        said contact zone comprising:
            first and second sections tilted relative to the linking portion, said first and second sections defining an obtuse angle therebetween;
            a curved section connected between said first and second sections, said curved section being capable of coming into contact with the integrated circuit; and an extremity portion extending from said second section and being aligned with said linking portion;

the method further comprising:

applying an electrically insulated lining on a lower surface of the connecting blade under said first, second and curved sections of said contact zone of said connection blade.

10. The method of claim 9, wherein applying a lining comprises gluing an insulating adhesive to the lower surface of said connection blade, at the contact zone.

11. The method of claim 9, wherein applying a lining comprises depositing a drop of resin on the lower surface of said connection blade, at the contact zone.

* * * * *